United States Patent [19]

Marusinec

[11] Patent Number: 5,783,775
[45] Date of Patent: Jul. 21, 1998

[54] TRANSFORMER DOOR WITH CORROSION RESISTANT BOTTOM STRIP

[75] Inventor: Richard Michael Marusinec, Delafield, Wis.

[73] Assignee: Cooper Industries, Inc., Houston, Tex.

[21] Appl. No.: 496,027

[22] Filed: Jun. 28, 1995

[51] Int. Cl.⁶ .................................................. H02G 3/14
[52] U.S. Cl. ................................. 174/50; 220/4.02
[58] Field of Search ........................ 174/50, 52.6, 58, 174/17 CT, 17 R; 220/4.02; 336/65; 312/326, 328, 327, 204; 52/515, 516; 49/501

[56] References Cited

U.S. PATENT DOCUMENTS

| | | | |
|---|---|---|---|
| 2,274,106 | 2/1942 | Strong et al. | 312/100 |
| 2,615,775 | 10/1952 | Clayboum et al. | 312/107 |
| 3,599,134 | 8/1971 | Galloway | 336/90 |
| 3,762,939 | 10/1973 | Hunter | 175/75 |
| 3,784,727 | 1/1974 | Haubein | 174/52 R |
| 3,841,032 | 10/1974 | Grannis | 52/27 |
| 4,533,786 | 8/1985 | Borgmeyer et al. | 174/50 |
| 4,556,758 | 12/1985 | Warden | 174/50 |
| 4,559,699 | 12/1985 | Owen et al. | 29/602 R |
| 5,471,692 | 12/1995 | Wasinger et al. | 8/159 |

*Primary Examiner*—Kristine L. Kincaid
*Assistant Examiner*—Dhiru R. Patel
*Attorney, Agent, or Firm*—Conley, Rose & Tayon,P.C.

[57] ABSTRACT

An improved transformer cabinet includes a cabinet door in which the lower portion of the door is replaced with a durable, corrosion resistant material. It is preferred that the replacement portion comprise a strip approximately three inches wide attached to the lower edge of a transformer cabinet door.

8 Claims, 5 Drawing Sheets

TRANSFORMER DOOR WITH CORROSION RESISTANT BOTTOM STRIP

TECHNICAL FIELD OF THE INVENTION

The invention relates in general to cabinets for electrical transformers, and more specifically to a cabinet door for transformers of the padmount type. Still more particularly, the present invention comprises a cabinet door having a corrosion resistant strip that forms its lower edge and rests on the cabinet sill when the door is closed.

BACKGROUND OF THE INVENTION

In electrical power distribution systems, distribution transformers are used to step down voltage between the high voltage power line and the user. Thus, transformers are present at virtually every distribution point. Transformers are typically mounted above ground on a junction pole, or at ground level on a pad or platform. The increased use of underground power distribution systems has resulted in a corresponding increase in the number of pad-mounted transformers. Pad-mounted transformers must be contained in a manner that will prevent tampering by unauthorized individuals. Typically, this is accomplished by enclosing the high voltage and low voltage termination components of the transformer within a metal cabinet. The transformer includes a tank, which contains the core and coil assembly immersed in oil, and a cabinet, which includes a top hinged door and a bolted in place sill. Connections for incorporating the transformer assembly into the power distribution system extend through one wall of the tank and are enclosed by the cabinet. In order to provide utility personnel the necessary access to the transformer connections the cabinet must include a door. Conventionally, such cabinet doors are three-dimensional, comprising a front, two sides and a top and are typically formed in two pieces, which are welded together. The cabinet door is pivotally attached to the tank along the top edge of the front plate of the tank. The cabinet also includes a low sill extending forward from the transformer tank, upon which the cabinet door rests when closed.

As a result of this construction, the cabinet door is exposed to various corrosive elements. For example, any condensate that may form inside the cabinet will tend to occur on the inside of the cabinet door. As the condensate collects, it may run down the inside of the door until it eventually pools along the bottom lip of the door or escapes through the interface between the cabinet door and the sill. Similarly, because the door/sill interface must be specially formed in order to provide adequate tamper and pry resistance, the multi-faceted interface between the door and sill is vulnerable to the collection of moisture and debris. Cabinet doors and sills are usually made from carbon steel.

In order to reduce the effects of corrosion, transformer cabinets, including the doors, are typically coated with paint or a similar corrosion-resistant finish, or are made of stainless steel. Both methods of protecting the cabinet door are relatively costly.

In addition, opening and closing of the cabinet door can damage the paint or other corrosion-resistant finish on the door and sill, forming chips or exposed areas that are susceptible to corrosion. Once corrosion begins, it can be costly and difficult to stop and/or repair.

Transformer tanks and front plates having corrosion resistant strips adjacent their lower edges are known. However, the corrosive conditions to which these pieces of equipment are exposed are not the same as the conditions that cause corrosion of the cabinet door. For example, the lower edges of the transformer tank and front plate rest on the pad and are susceptible to damage during installation, due to the tank bottom being scraped against the cement pad, and to debris collecting between the cement pad and the bottom edges of the tank. In contrast, the conditions to which the door is exposed result from damage due to opening and closing the cabinet door, and exposure to contaminants that run down the exterior of the cabinet door surface and collect either in the cabinet door edge itself or between the cabinet door edge and the upper sill edge. The parallel surfaces between the sill and cabinet door are typically the worst areas for corrosion initiation. Once started, the corrosion tends to extend in both directions from the sill/door interface.

Since the transformer cabinet door is the only portion of the cabinet that undergoes significant amounts of movement, it is more vulnerable to damage resulting from such movement. Similarly, as the cabinet door is relatively thin and is less thermally insulated than the tank, it is more likely to collect condensate during the duty cycle of the transformer, or whenever the temperature outside of the cabinet is below the dew point of the air inside the cabinet. Thus, the cabinet door is particularly exposed to the corrosive and destructive forces that can shorten the useful life of the equipment.

Hence it is desired to provide a transformer cabinet door having improved durability and resistance to corrosion. It is further desired to provide a door that is inexpensive and requires very little maintenance or repair and can withstand exposure to outside weather.

SUMMARY OF THE INVENTION

The present invention is a new and improved transformer cabinet door having a corrosion- and damage-resistant strip along its lower edge. The strip is preferably made of stainless steel, but may alternatively be constructed of any suitable corrosion resistant, durable material. The corrosion-resistant strip of the present invention preferably extends around the entire lower edge of a transformer cabinet door. The strip is preferably affixed to the door by means of laser welding, but can alternatively be attached by MIG or TIG welding, or other suitable attaching means.

Other objects and advantages of the invention will appear from the following description.

BRIEF DESCRIPTION OF THE FIGURES

For a detailed description of a preferred embodiment of the invention, reference will now be made to the accompanying drawings wherein.

DETAILED DESCRIPTION OF THE INVENTION

Figure 1:
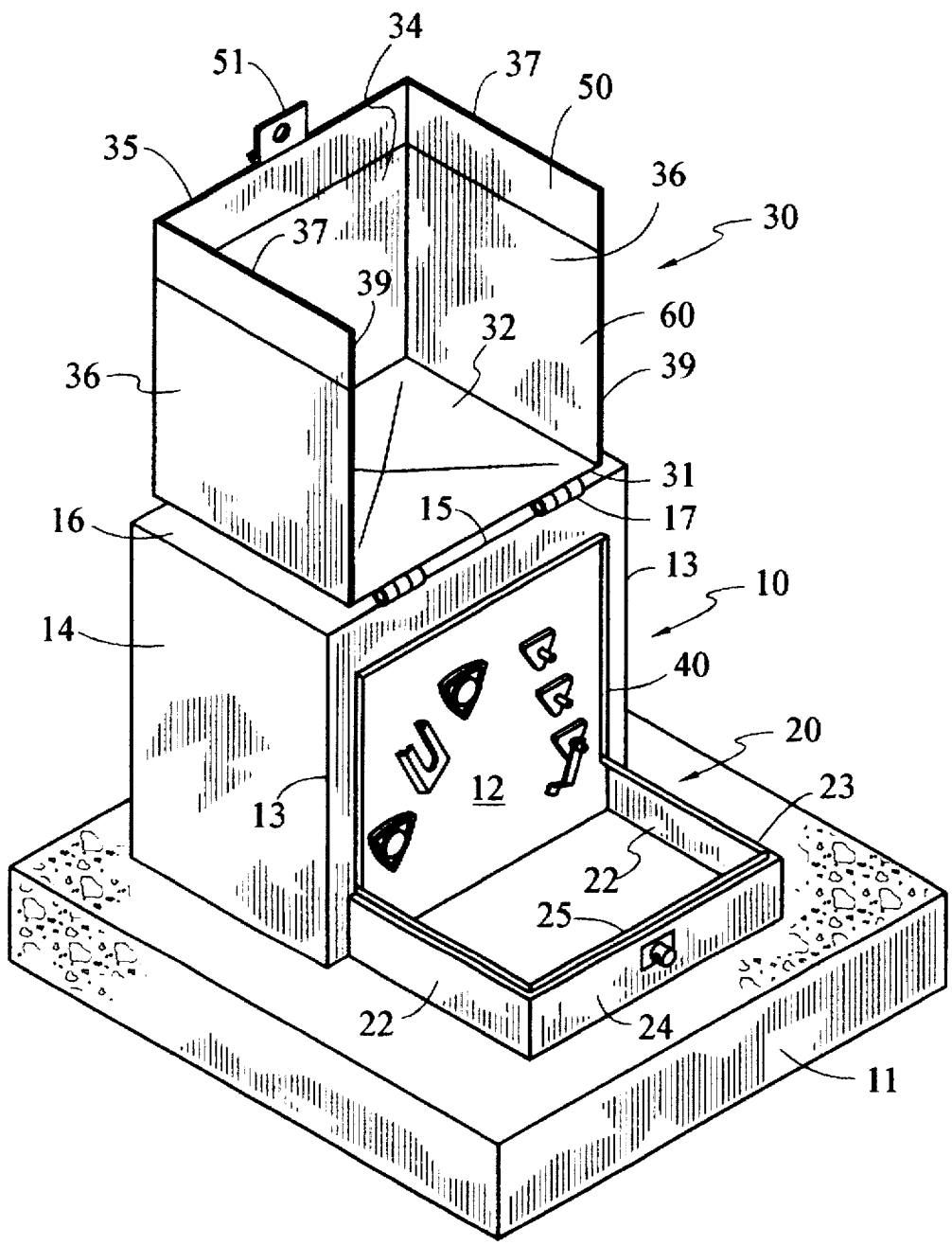
FIG. 1 is a perspective view of a transformer cabinet constructed in accordance with the present invention, with its door in an open position.

Referring initially to FIG. 1, a transformer core and coil assembly (not shown) is typically housed in a tank 10 having a front plate 12, sides 14, and top 16. Tank 10 typically houses the core and coil assembly immersed in oil and includes various electrical fittings and components connected to the transformer and extending through front plate 12. Extending from the bottom of side edges 13 is a sill, or risers 20 that includes sides 22 and a front 24. Sill 20 is typically formed from a single piece of metal that is bent into the desired shape. Tank 10 and riser 20 typically rest on a concrete, fiberglass or plastic transformer pad 11 and are affixed thereto by bolts or the like.

Figure 2:
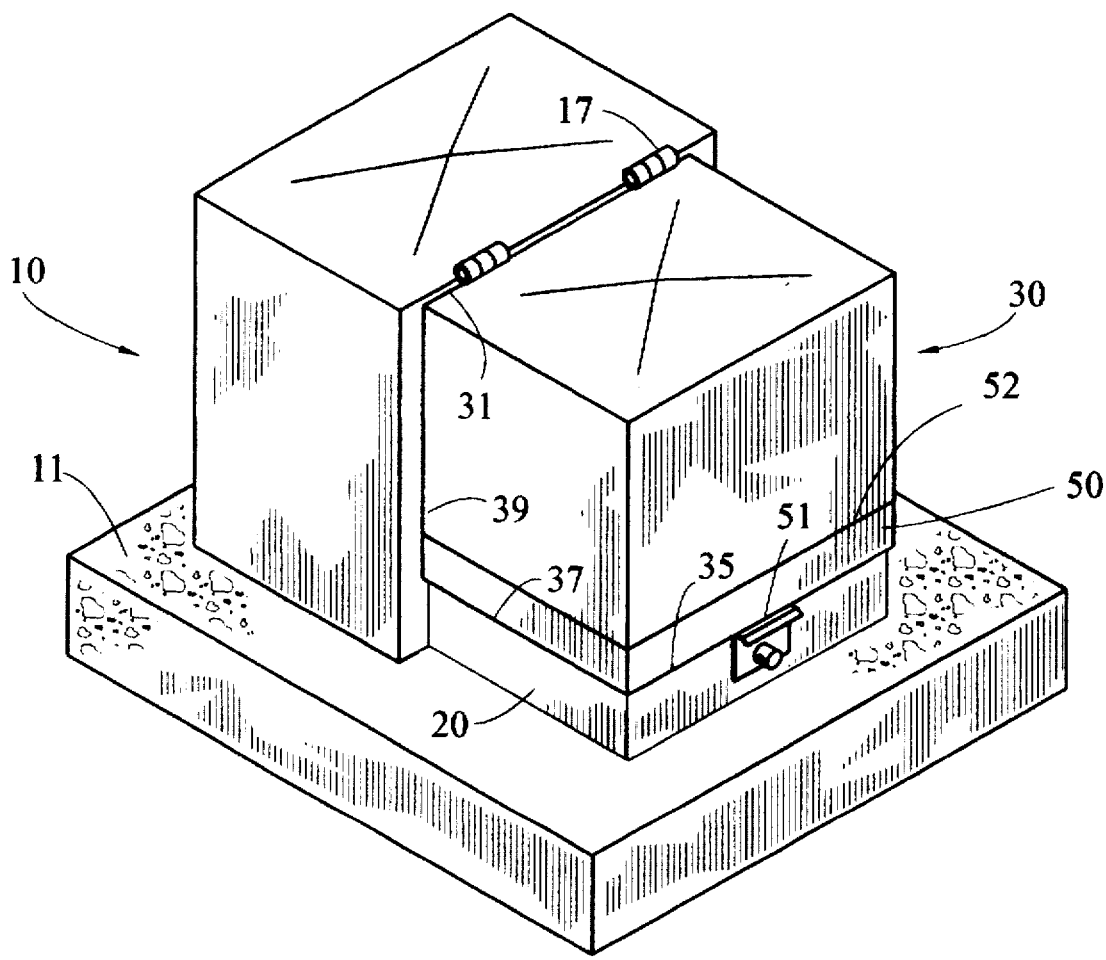
FIG. 2 is a perspective view of the transformer cabinet of FIG. 1 with its door in a closed position.

A cabinet door 30 is pivotally attached to upper edge 15 of front plate 12 by means of hinges 17 or the like. Cabinet door 30 includes a top panel 32, a front panel 34, and two side panels 36. Front and side panels 34, 36 are typically formed from a single piece of metal that is bent into the desired shape, to which top panel 32 is attached. Cabinet door sides 36 include lower side edges 37 and rear side edges 39. Cabinet door front panel 34 includes a lower front edge 35, and cabinet door top panel 32 includes a rear top edge 31. A conventional locking latch 38 and handle 51 are affixed to the lower edge of front panel 34, as discussed in greater detail below. Cabinet door 30 is configured to complement the space defined by riser 20 and front plate 12, so that when door 30 is closed, as shown in FIG. 2, it rests on riser 20 and forms an interface with the tank and riser along edges 31, 39, 35 and 37. In this manner, door 30 encloses the electrical components extending through front plate 12. Because the purpose of cabinet door 30 is to prevent unauthorized access to the transformer components, it is necessary that the interfaces between the cabinet door 30 and tank 10 and riser 20 be tamper-proof.

Figure 3:
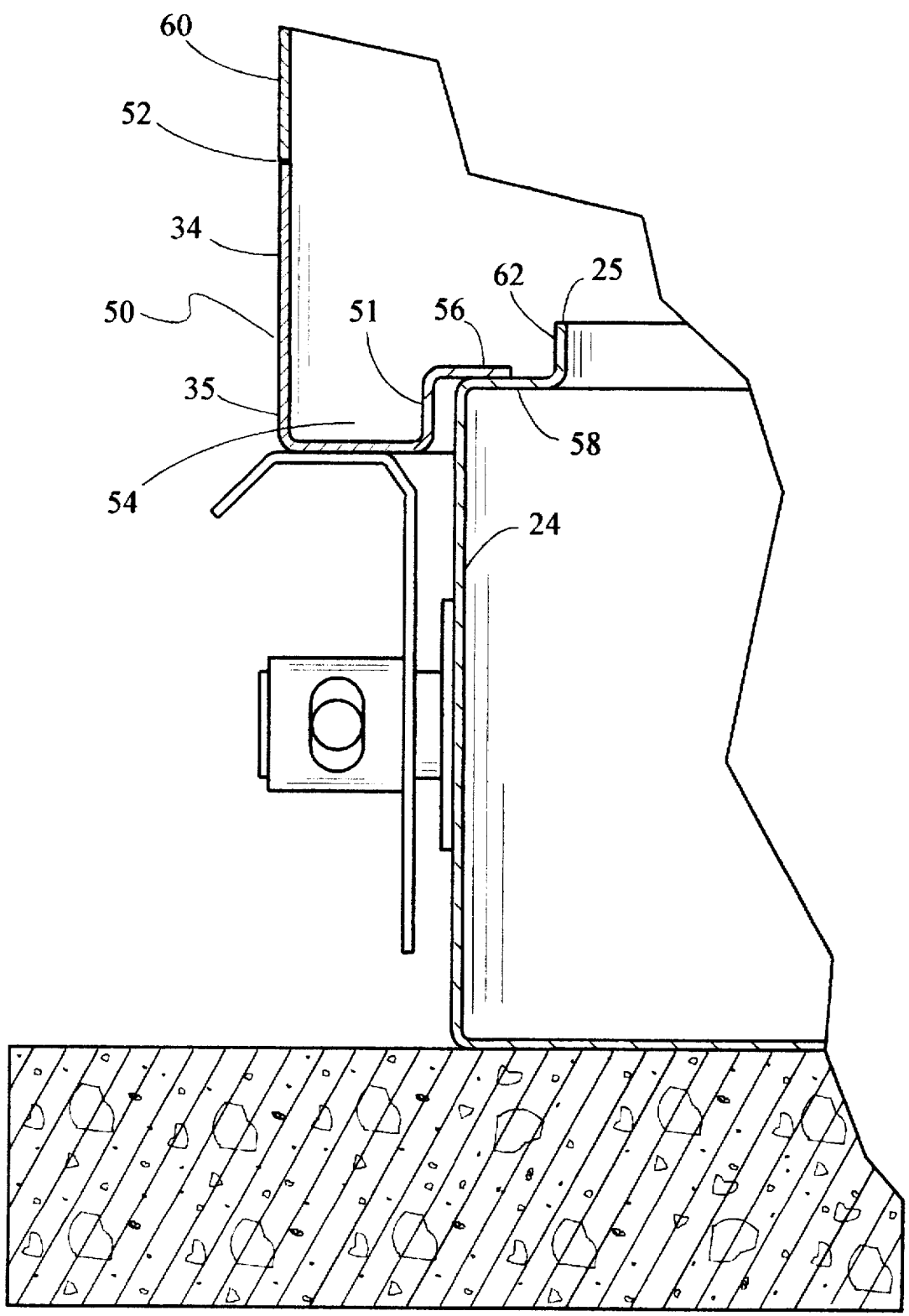
FIG. 3 is a cross-sectional view of the lower front edge of a cabinet door constructed according to the present invention.

Referring now to FIGS. 1-3, the present invention comprises an improvement in the cabinet door whereby the lower portion of the door is replaced with a strip 50 of durable, corrosion-resistant material. The material is preferably 409 stainless steel, but those skilled in the art will recognize that other durable, corrosion-resistant materials can also be used, including AISI 300 series stainless steel, zinc-plated, galvanized, or made of or coated with any other weldable, corrosion resistant alloy. The upper portion 60 of door 30 is constructed according to convention, and is typically made of mild steel.

The width of strip 50 is preferably between one and ten inches wide and more preferably approximately three (3) inches, or is 10-15 percent of the total vertical height of cabinet door 30. Greater width is not preferred because the additional cost exceeds the advantages. On the other hand, strips much less than three inches wide tend to be undesirable because they would not incorporate the entire horzontal surface of the bottom edge of the door and the area of the door in close proximation of the sill. The lower edges 35, 37 of door can be shaped into any desired configuration for engagement with the upper edges 23, 25 of sill 20. Examples of various configurations for the lower door edges 35, 37 can be found in FIGS. 4 and 5, discussed below, and in co-pending application Ser. No. 08/411,482.

Stainless steel strip 50 is attached by means of a welded or bonded seam 52 between strip 50 and the upper portion of door 30, and is attached during manufacture of door 30. Alternatively, other conventional attachment means can be used, such as overlapping the edges of strip 50 and upper portions 60 and joining them by conventional mechanical methods. Once strip 50 is attached to upper portion 60, door 30 can be used in the same manner as a conventional transformer door, and can be substituted for existing cabinet doors if desired.

By replacing only portions of door 30 with corrosion-resistant material, significant cost advantages can be realized, as corrosion-resistant materials typically cost significantly more than the mild steel from which door 30 is conventionally made.

As shown in FIG. 3, the lower edge of door 30 includes a channel 54 and a lip 56, which rests on a shoulder 58 adjacent upper edge 25 of sill 20 when door 30 is in a closed position.

Channel 54 along lower edges 35 and 37 is preferably 0.50 inches deep. All channels are preferably 0.5-1.0 inches wide, and more preferably approximately 0.7 inches wide, and all flanges are preferably 0.2-1.0 inches wide, and more preferably 0.5 inches wide. The present invention allows the sides and front of cabinet door 30 to be formed from a single piece of metal, as the channels and flanges can be formed by bending or pressing the edges of a flat sheet. Prior to bending and forming the channels, the corners of the flat sheet of metal are notched so that the finished channels come together at the corners and do not result in excess material. Once the desired channels and bends have been formed, the seams at the corners of the door are welded. The finished cabinet door including channels and flanges can be coated as desired. According to a preferred embodiment, at least one weephole 51 can be drilled through channel 54, for allowing moisture that condenses on the inside wall of door 30 to drain out and down the outside of sill 20. An additional advantage of the present non-corrosive strip is that it prevents corrosion around the weephole.

In addition to the corrosion resistant strip 50 along the lower edges of the cabinet door 30, it may be desired to replace a portion of the door along rear top edge 31 with an additional corrosion resistant strip. This is accomplished in the same manner and using the same materials described above.

Figure 4:
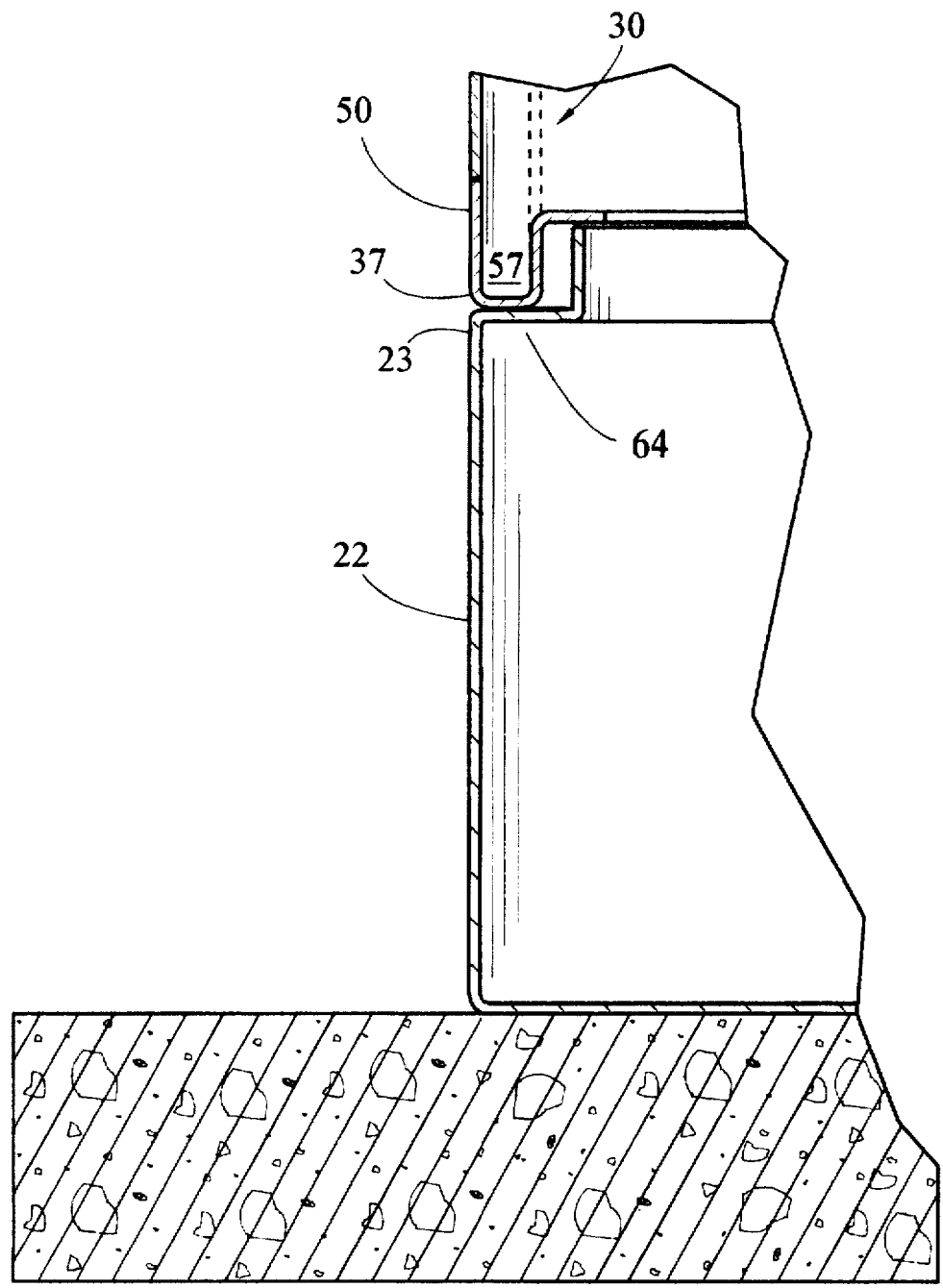
FIG. 4 is a cross-sectional view of an alternative embodiment of the lower front edge of a cabinet door constructed according to the present invention.
Figure 5:
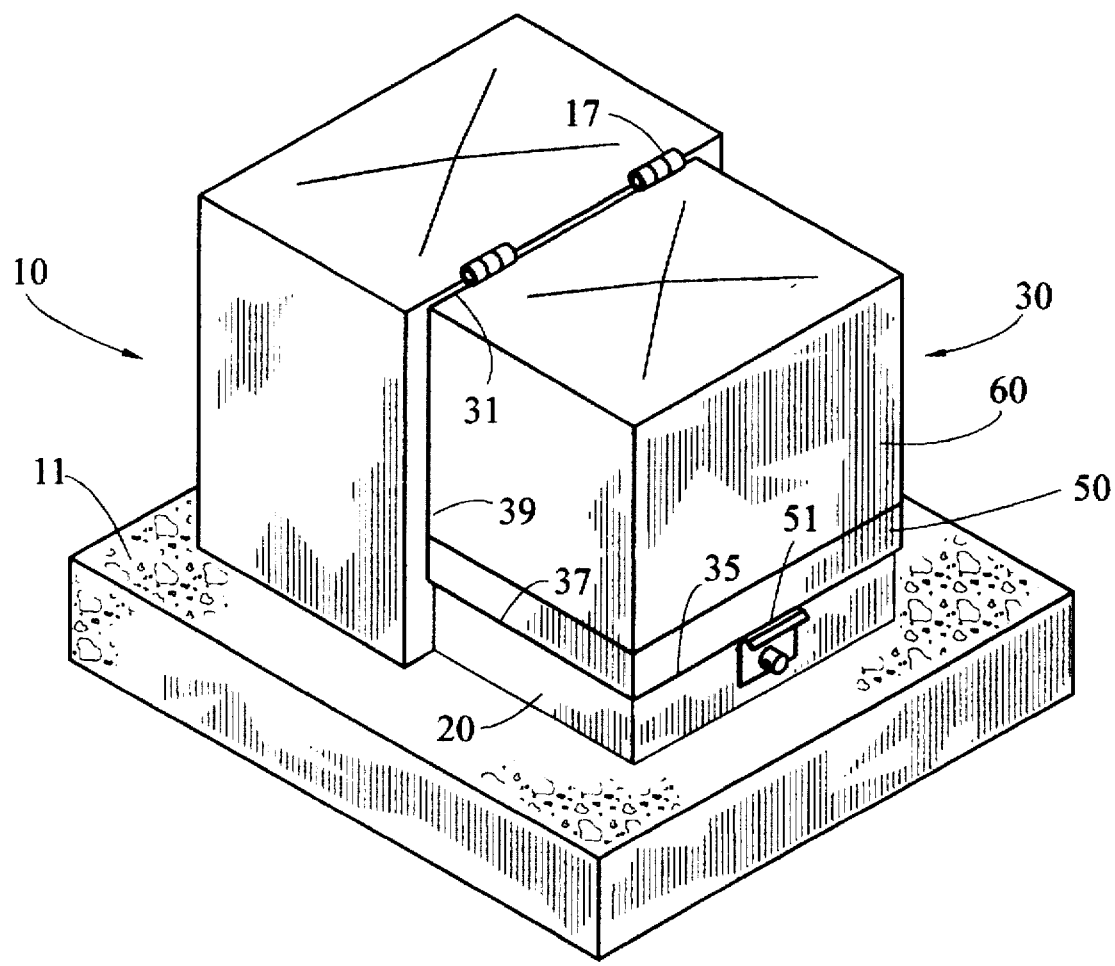
FIG. 5 is a perspective view of the transformer cabinet of FIG. 4 with its door in a closed position.

Referring now to FIGS. 4 and 5, an alternative embodiment of the cabinet door does not overhang the upper edge of the sill, but rests on it instead. As shown in FIG. 4, lower edge 37 of door 30 includes a channel 57, the bottom of which rests on a shoulder 64 at the top edge of sill 20. Although the interface between door 30 is different in this embodiment, the corrosion resistant strip 50 can be used to form the bottom portion of the door in the manner described above.

The cabinet door according to the present invention has been illustrated in terms of channels and flanges formed by 90° bends in the metal. One skilled in the art, however will understand that the crux of the invention encompasses similar channels and flanges formed by other than 90° bends. For example, lower front channel 54 can be formed by two or more bends whose angles total 180°, by a hemicircular bend, or any other channel-forming configuration. If non-right angles are used, each angle should be between 60° and 120°. The angle at which the shoulder is formed in the sill can be varied, accompanied by a corresponding variation in the angle of lip 56. These variations are also applicable to the lower side interfaces.

While a preferred embodiment of the invention has been shown and described, modifications thereof can be made by one skilled in the art without departing from the spirit of the invention.

What is claimed is:

1. A padmounted transformer, comprising:

a tank housing a transformer core and coil assembly and including a front plate through which electrical connections for said assembly extend, said front plate having upper, side and lower edges;

a sill extending from said side edges of said front plate adjacent said lower edge; and a cabinet door pivotally mounted on said upper edge for enclosing said electrical connections, said door including a lower edge for engaging said sill, a portion of said door adjacent said lower edge of the door comprising a corrosion-resistant material that is different from a material from which the balance of said door is made.

2. The transformer according to claim 1 wherein said door portion comprises stainless steel.

3. The transformer according to claim 1 wherein said door portion comprises a strip of metal between one and ten inches wide.

4. The transformer according to claim 1 wherein said door portion comprises a strip of metal approximately three inches wide.

5. The transformer according to claim 1 wherein said cabinet door further includes a rear edge for engaging said tank, and further including a second strip of corrosion resistant material along and forming said rear edge.

6. The transformer according to claim 5 wherein said cabinet door includes top, front and side panels and said second strip of corrosion resistant material extends along only the rear edge of said top panel.

7. A transformer cabinet having a door and a sill, the improvement comprising:

a lower portion of said door constructed from a corrosion-resistant material that is different from a material from which the balance of said door is made.

8. The transformer cabinet according to claim 7 wherein said lower door portion comprises stainless steel.

* * * * *